United States Patent
Basak et al.

(10) Patent No.: US 7,392,231 B2
(45) Date of Patent: Jun. 24, 2008

(54) DETERMINING UTILITY FUNCTIONS FROM ORDENAL RANKINGS

(75) Inventors: Jayanta Basak, New Delhi (IN); Manish Gupta, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 574 days.

(21) Appl. No.: 10/308,401

(22) Filed: Dec. 3, 2002

(65) Prior Publication Data
US 2004/0107171 A1   Jun. 3, 2004

(51) Int. Cl.
*G06N 5/00* (2006.01)
*G06E 3/00* (2006.01)

(52) U.S. Cl. .......................................... 706/31; 706/45
(58) Field of Classification Search ............. 706/15–44, 706/45
See application file for complete search history.

(56) References Cited

U.S. PATENT DOCUMENTS

| | | | | |
|---|---|---|---|---|
| 5,754,939 | A * | 5/1998 | Herz et al. .................. | 455/3.04 |
| 6,581,048 | B1 * | 6/2003 | Werbos ....................... | 706/23 |
| 6,678,669 | B2 * | 1/2004 | Lapointe et al. ............... | 706/15 |
| 6,708,160 | B1 * | 3/2004 | Werbos ....................... | 706/30 |
| 6,732,090 | B2 * | 5/2004 | Shanahan et al. .............. | 707/3 |
| 6,882,992 | B1 * | 4/2005 | Werbos ....................... | 706/48 |
| 6,915,269 | B1 * | 7/2005 | Shapiro et al. ................ | 705/10 |
| 2002/0161731 | A1 * | 10/2002 | Tayebnejad et al. ........... | 706/20 |
| 2003/0233310 | A1 * | 12/2003 | Stavrovski ................... | 705/37 |
| 2005/0131847 | A1 * | 6/2005 | Weston et al. ................. | 706/12 |

OTHER PUBLICATIONS

Beyhnam Malakooti, Ying Q. Zhou, "Feedforward Artificial Neural Networks for Solving Discrete Multiple Criteria Decision Making Problems", Management Science/vol. 40, No. 11, Nov. 1994, pp. 1542-1561.*

Malakooti, B. "A decision support system and a heuristic interactive approach for solving discrete multiple criteria problems", Systems, Man and Cybernetics, IEEE Transactions on, vol. 18, Issue 2, Mar.-Apr. 1988 pp. 273-284.*

Robert J. Kuligowski and Ana P. Barros, "Experiments in Short-Term Precipitation Forecasting Using Artificial Neural Networks", Monthly Weather Review: vol. 126, No. 2, pp. 470-482.*

Antonie Stam, Minghe Sun, Marc Haines, "Artificial neural network representations for hierarchical preference structures", Computers and Operations Research, vol. 23, No. 12, Dec. 1996, pp. 1191-1201.*

Minghe Sun; Antonie Stam; Ralph E. Steuer, "Solving Multiple Objective Programming Problems Using Feed-Forward Artificial Neural Networks: The Interactive FFANN Procedure", Management Science, vol. 42, No. 6. (Jun. 1996), pp. 835-849.*

(Continued)

*Primary Examiner*—Anthony Knight
*Assistant Examiner*—Adrian Kennedy
(74) *Attorney, Agent, or Firm*—Gibb & Rahman, LLC (57) ABSTRACT

A user's preference structure in respect of alternative "objects" with which the user is presented is captured in a multi-attribute utility function. The user ranks these competing objects in order of the user's relative preference for such objects. A utility function that defines the user's preference structure is provided as output on the basis of this relative ranking. This technique can be used to assist a buyer in selecting between multi-attribute quotes or bids submitted by prospective suppliers to the buyer.

20 Claims, 4 Drawing Sheets

OTHER PUBLICATIONS

Behnam Malakooti and Vishnu Raman, "Clustering and selection of multiple criteria alternatives using unsupervised and supervised neural networks", Journal of Intelligent Manufacturing, vol. 11, No. 5, Oct. 2000, pp. 435-451.*

Benham Malakooti and Ying Q. Zhou, "Feedforward Artificial Neural Networks for Solving Discrete Multiple Criteria Decision Making Problems", Management Science, vol. 40, No. 11, Nov. 1994, pp. 1542-1561.*

Robert J. Kuligowski and Ana P. Barros, "Experiments in Short-Term Precipitation Forecasting Using Artificial Neural Networks", Monthly Weather Review vol. 126, No. 2 pp. 470-482.*

Malakooti et al., Behnam, "Feedforward Artificial Neural Networks for Solving Discrete Multiple Criteria Decision Making Problems", Management Science, Nov. 1994.*

Kuligowski et al., Robert, "Experiments in Short-Term Precipitation Forecasting Using Artificial Neural Networks", American Meteorological Society, 1998.*

R.L. Kenney and H. Raiffa, Decisions with Multiple Objectives, Wiley, New York, 1976.

M. Bichler, J. Lee, C.H. Kim, and H.S. Lee, Design and implementation of an intelligent decision analysis system for e-sourcing, *IBM Research Report*, RC 22048(98946) Apr. 30, 2001.

V.S. Iyengar, J. Lee, and M. Campbell, Q-Eval : evaluating multiple attribute items using queries, *ACM Electronic Commerce*, EC01, Oct. 14-17, Tampa, Florida, USA.

T.L. Satty, *The Analytic Hierarchy Process*, McGrawHill, New York, USA, 1980.

G. Tewari and P. Maes, Design and implementation of an agent-based intermediary infrastructure for electronic markets, *ACM Conference on Electronic Commerce*, EC00, pp. 86-94, 2000.

E. Andren, Negotiation software helps work out e-commerce details, *Gartner Group Research Notes*, ECEA, 9, 2001.

* cited by examiner

DETERMINING UTILITY FUNCTIONS FROM ORDINAL RANKINGS

FIELD OF THE INVENTION

The present invention relates to determining utility functions for use in determining or representing user preferences.

BACKGROUND

Auction software often allows bidders (for example, suppliers) to specify multiple attributes associated with their bids, such as quality, terms and conditions, etc. Consequently, bidders can differentiate themselves by factors other than price.

Weighting factors enable buyers to rate the relative importance of attributes that may be associated with bids. A buyer can specify weighting factors for each attribute using a sliding scale, in which the user can choose from various options such as "do not care", "important", "more important", "very important", and "most important".

There also exists software for performing "Request for Quotes" (RFQ). Some software permits complex configuration and bill-of-material relationships. Suppliers can specify quotes having ranges of attributes, and price variations for terms and conditions. In some cases, a buyer can post a RFQ, and the software automatically (i) searches supplier's rules (predefined and stored in a database), (ii) calculates a best offer for each supplier, and (iii) ranks all offers according to criteria that are most important to a buyer.

In some existing RFQ software, buyers (that is, users) can specify the weighting factors of each attribute explicitly. However, these softwares demand a thorough knowledge/perception about the attributes from a user. On the other hand, rest of the software accept input from a user about the order (partial or full) on the items or bids and extract the weighting factors (utilities) of the attributes from the specified order.

In software that accepts an ordered list (full or partial) of items/bids from a user, the utility function of the item/bid is expressed as a parametric function of the attributes. There exist a number of investigations concerning techniques for representing the utility function of the bids/items having multiple attributes and subsequent techniques for the parametric model fitting on the ordinal data sets (that is, ordered set of items). In general, such an approach may be classified as belonging to multi-attribute utility theory (MAUT).

In multi-attribute utility theory (MAUT), parametric utility functions can be classified according to different levels of complexity. Types of parametric utility function include multilinear, multiplicative, and additive models. Solutions to the problem of evaluating attributes are proposed for additive models only, the utilities for individual attributes are considered to be independent. For additive utility functions, evaluation of the utility function, and subsequent ranking of the objects, is performed by assessing the weights of the attributes by formulating the problem as a linear programming task.

There are two primary limitations associated with the existing tools described above.

First, users' preference structures are represented by what is essentially a linear additive utility function, namely a weighted sum of utility functions for individual attributes. For example, if attributes associated with a bid are price and quality, then a relevant utility function for the buyer, U(price, quality), is defined as U(price, quality)=$w_1 \times$U(price)+$w_2 \times$U(quality). In this expression, U(price) and U(quality) are respectively the buyer's individual utility functions for price and quality.

Second, individual attribute utility functions are assumed a priori. In the example above, U(price) and U(quality) are assumed to be known, and the buyer effectively specifies weights $w_1$ and $w_2$ by indicating the relative importance of the respective attributes on a sliding scale, such as that described above.

In view of the above observations, a need clearly exists for representing a user's preferences when selecting between competing alternatives.

SUMMARY

A technique for determining a utility function having multiple attributes is described herein, assuming that there exists a partly or fully ranked set of objects. Nonlinear interactions between individual attributes are assumed, and there is also assumed to be no a priori knowledge about individual attribute utility functions.

Objects partially or fully ordered) having multiple attributes are accepted as input, and a multi-attribute utility function is provided as output. The ordered set of objects can either be directly obtained from a user, or determined from past interactions with the user or observed behavior of the user. This multi-attribute utility function is essentially "learned" from the ordered set of objects. A technique for learning a utility function using a feed-forward neural network is described. The neural network iteratively learns the utility function from pairs of items in the ranked list.

The techniques described herein are presented in the context of a buyer selecting between alternative bids or quotes submitted by prospective suppliers. The described techniques, however, apply more generally to any user's preference structure in respect of alternative "objects" with which the user is presented. The user ranks these competing objects in order of the user's relative preference for such objects. A utility function that defines the user's preference structure is provided as output on the basis of this relative ranking.

DETAILED DESCRIPTION

In "real-life" problems, a user may be considered to have an inherent preference structure involving objects having multiple attributes. An example of such a real-life problem is evaluating responses received, from suppliers, by a buyer for the buyer's RFQ. The buyer's preference structure is represented, mathematically, by a utility function that specifies these relevant attributes.

The responses specify multiple attributes (of interest to the buyer), and the buyer chooses from amongst favorable responses received from suppliers. Examples of attributes that may comprise a response to a RFQ are "price", "quality", "quantity". A buyer's preference structure over the entire attribute space is likely to involve dependencies between different attributes.

For buyers, attributes "price" and "quality" are likely to be related in a buyer's preference structure. A buyer, for example, may prefer a quote having a higher price and higher quality equally as much as a response having a lower price and medium quality. Interdependencies of this sort between different attributes are quite likely to be nonlinear.

The described techniques can be used to learn a buyer's preference structure (represented as a utility function) over a space of multi-attributed responses. The buyer provides a set of ranked responses, as a training example, so that the utility function can be determined.

Figure 1:
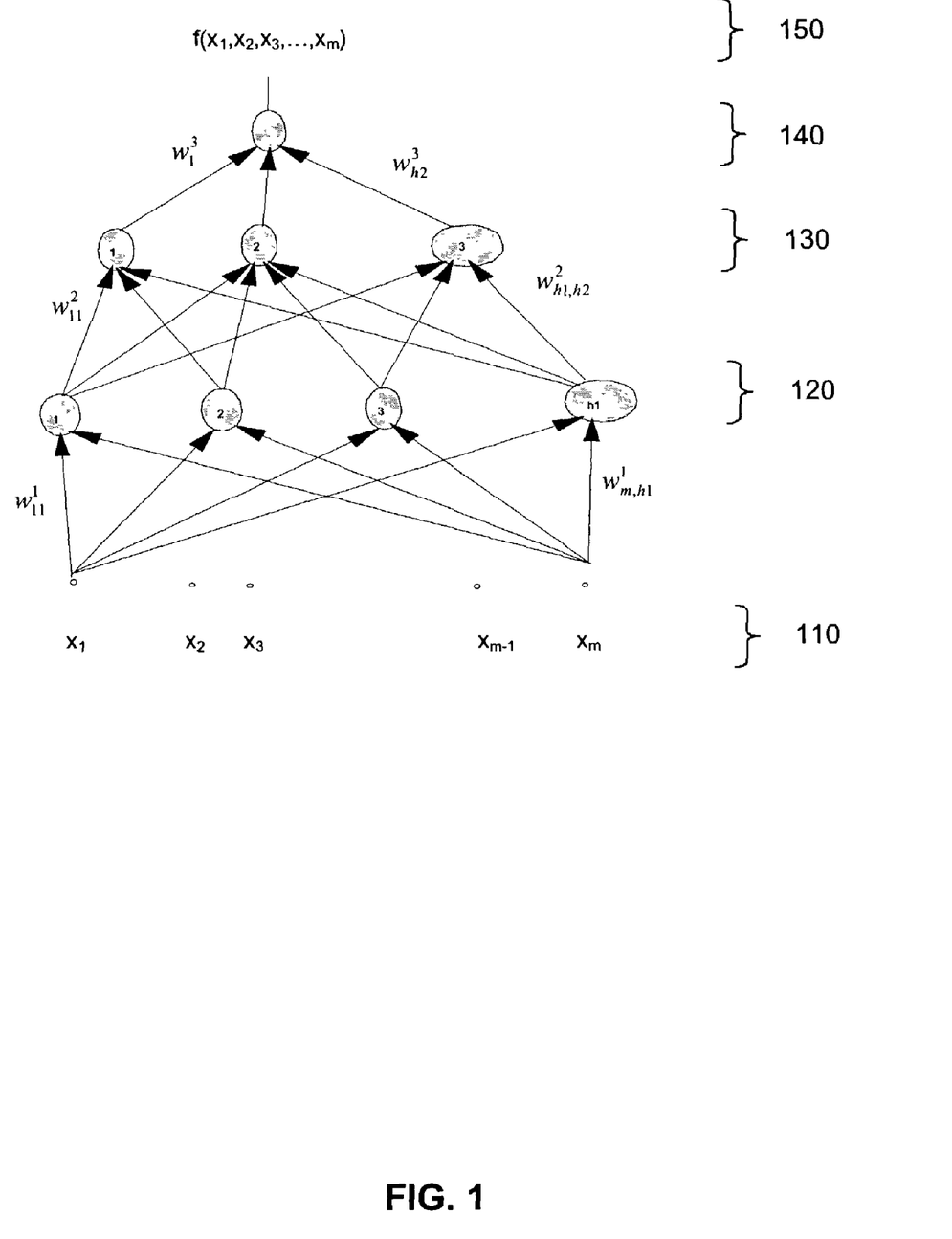
FIG. 1 is a schematic representation of a feed-forward neural network used in a described technique for determining a multi-attribute utility function.

FIG. 1 schematically represents a feed-forward neural network that is used to "learn" such a utility function. The output of the neural network of FIG. 1 (that is, $f(x_1, x_2, x_3, \ldots x_m)$) corresponds to a learned utility function. The input vector X 110 comprises values $\{x_1, x_2, x_3, \ldots x_m\}$ that corresponds to different attributes of the multi-attributed object that is provided as input. Input vector X 110 is input to a first layer 120 of the neural network of FIG. 1. This first layer 120 connects to a second layer 130, which in turn connects to a summation node 140. The summation node 140 outputs the utility function $f(x_1, x_2, x_3, \ldots x_m)$ 150.

Table 1 below presents a prescriptive indication of an approximate number of nodes to be used in the hidden layer of the feed-forward neural network of FIG. 1 for different number of attributes (that is, dimensionality of the input vector X 110), and different types of utility functions.

TABLE 1

| Type of Utility Function (m- Dimensional input vector) | Number of Hidden Nodes in First Layer | Number of Hidden Nodes in Second Layer |
|---|---|---|
| Linear | O(m) | O(1) |
| Quadratic | O(m) | O(2) |
| Polnomial of O(r) | O(m) | O(r) |
| Log-polynomial of O(r) | O(m) | O(r) |
| Exponential of Polynomial of O(r) | O(m) | O(r) |

Techniques described herein are presented in the form of an algorithm, and each step of the algorithm is described in detail. Each object i is represented as an m-dimensional vector $x_i = (x_{i1}, x_{i2}, \ldots, x_{im})$.

The described algorithm, which can be conveniently referred to as "bid evaluation", receives as input r, which is a ranked list of objects. The bid evaluation algorithm provides as output $f(.)$, which is a utility function.

The input list r, an either partly or fully ranked subset of items/bids, can be represented as a set of ordered pairs in the following manner:

r={$(x_i,x_j)$: $x_i$ is preferred over $x_j$ by the user and provided as input to the system}

The Input Ranked List r consists of object pairs provided by the user, out of $n(n-1)/2$ possible pairs for n objects ($|r| \leq n(n-1)/2$) specified by the system to the user. Each object pair indicates a transitive relationship of preference such that (a,b) indicates that a is preferred over b, and given (a,b) and (b,c), a is preferred over c, by implication.

Figure 2:
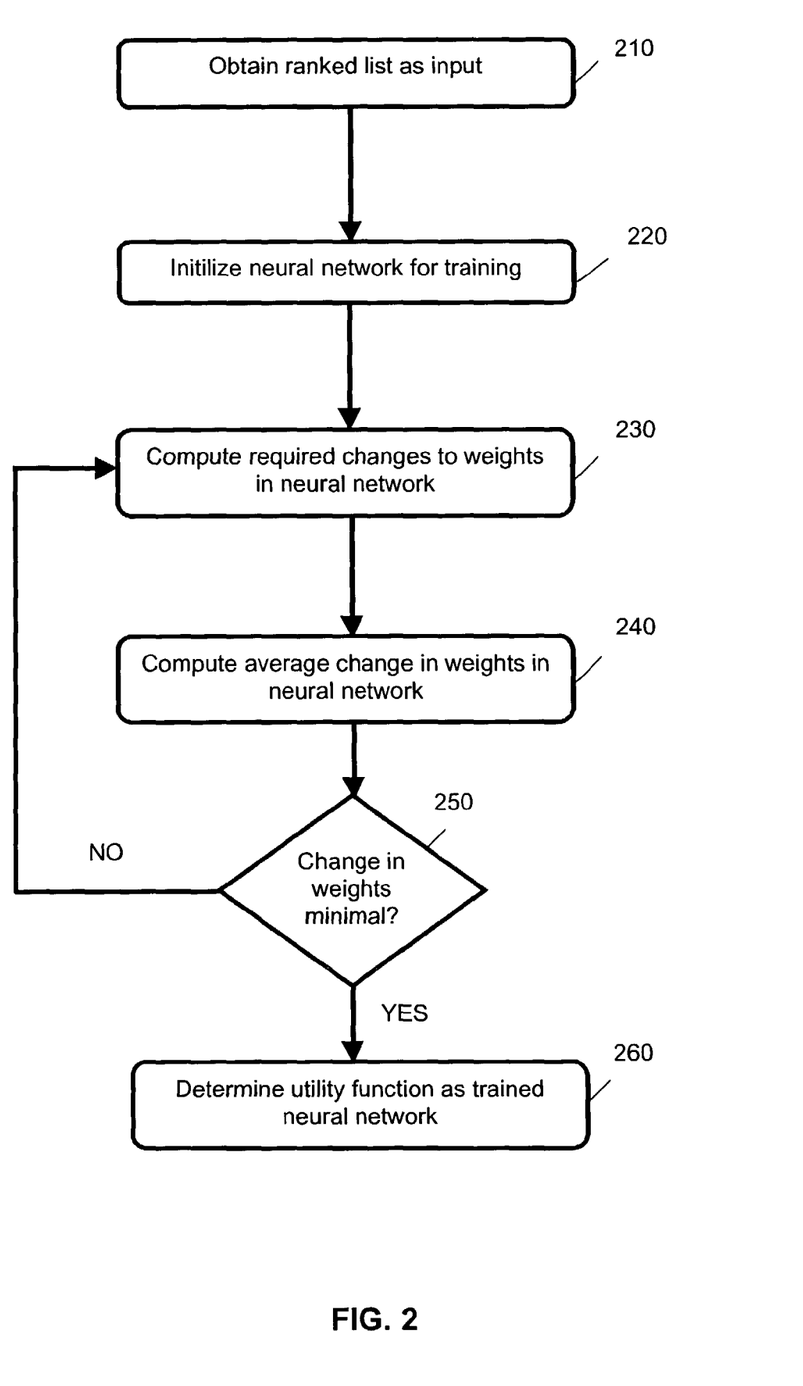
FIG. 2 is a flowchart that represents steps in the described technique for determining a multi-attribute utility function.

FIG. 2 flowcharts steps involved in the described algorithm for bid evaluation. Each of the flowcharted steps is described below with reference to correspondingly numbered steps, both briefly in Tables 2 and 3 below, and also in further detail under respectively entitled subsections.

TABLE 2

| Step 210 | Get the inputted ranked list r. |
|---|---|
| Step 220 | Initialize a multi-layered feed-forward neural network (represented in FIG. 1) for training. This procedure is repeat for every pair of objects $(x_i, x_j)$ in the ranked list r. |
| Step 230 | Compute the required change in parameter weights of the neural network in every iteration and for each individual pair of bids/items in r. |
| Step 240 | Compute an average change in parameter weights of the neural network of FIG. 1 for all possible pairs in the ranked sublist r provided by the user. |
| Step 250 | Repeat steps 230 and 240 until there is no significant change in the parameter weights calculated in step 240. |
| Step 260 | For any given input object, the output of the trained neural network corresponds to the utility function $f(.)$. |

Table 3 below presents pseudocode corresponding to the steps of Table 2 and FIG. 2.

TABLE 3

```
algorithm bid_evaluation        (Input r: ranked list of items;
                                 Output f(.): utility function)
r = ranked list                  ! step 210
initilize neural network         ! step 220
repeat
  for (every pair (x_p, x_q) in r)
    calculate change in weights in neural network;
                                                 !step 230
  end for
  compute average change in weights in neural
    network for all pairs (x_p, x_q) in r;        !step
    240
until (only minimal change n parameter weights)
                                                  !step
    250
  return neural network                           !step
    260
end bid_evaluation
```

Each of the above-described steps is described in further detail below.

Obtaining a Ranked List—Step 210

A user can explicitly provide a list of ranked objects (list r), or the list can be implicitly obtained from observed behavior of the user, or from other transactions with the user. The objects are ranked in descending order of the user's preference for the respective objects, from more preferred to less preferred. The ranking is relative not absolute; that is, only the ranked objects are considered, rather than the total set of objects.

Initializing Network for Training—Step 220

A suitable architecture is first selected for a feed-forward network. FIG. 1 presents a representative architecture, and Table 1 above presents a suggested order of magnitude for the number of nodes in hidden layers of the selected multi-layered network. These suggestions depend on the number of attributes of an object, which is the same as the number of inputs to the network (that is, m), and the order of complexity of the utility function to be obtained. For example, if an object has 12 attributes, the number of hidden nodes in the first hidden layer may be selected as 12±2.

All weights of the links and thresholds of the nodes are initialized to small random values (for example, in the range specified by [−0.1, 0.1]). These seed values provide a basis for training the neural network.

Calculating Revised Parameter Weights—Step 230

Step 230 is performed for every pair of objects $(x_p, x_q)$ in the ranked list r. Here $(x_p, x_q)$ implies that $(x_p > x_q)$ in the ranked list r. That is, $x_p$ is preferred over $x_q$. The repeated calculation in step 230 corresponds to the iterative training steps of the neural network of FIG. 1. In each iteration, all ordered pairs in the list of ranked objects r is desirably used. Step 240 is performed (as described below) to compute the average change in the parameters of the neural network required to perform the training in each iteration.

A pair of objects $(x_p, x_q)$ is taken as an initial input. The neural network output is calculated for both objects in the pair individually, for computing the required change in network parameters as described below. To compute the neural network output for a particular object (for example, $x_p$) the input to the neural network is the attribute vector $x_p$, which represents the corresponding object. The corresponding output of the neural network is the resulting utility function $f(x_p)$ generated by the neural network.

If $f(x_p)$ is less than or equal to $f(x_q)$, then the network is considered to have made an error. An error is made because the utility function $f(.)$ implied by the neural network effectively ranks $x_q$ above $x_p$.

The error measure is expressed in Equation (1) below $$E(p, q) = \begin{cases} f(x_q) - K \cdot f(x_p) & \text{when } f(x_p) \leq f(x_q) \text{ but } x_p > x_q \\ 0 & \text{otherwise} \end{cases} \quad (1)$$

In Equation (1), K is a constant between zero and one; that is, 0<K<1. A typical value of K may be, for example, 0.95. The overall error measure is expressed in Equation (2) below $$E = \sum_{p,q} E(p, q) \quad (2)$$

The described algorithm then computes the required change in weights of the links connecting neurons between successive layers of the neural network, to reduce the error made by the neural network with the current weights (as given by the error measure Equation (2)). The parameters (that is, weights of the links connecting neurons between successive layers) are changed in the opposite direction of the error gradient (gradient descent) so that a movement by a small factor in the parameter space opposite to the gradient direction results in a decrease in the total error (on the pairs of training bids/items).

For the pair of objects $(x_p, x_q)$, for every i, j, and l, the expression $\Delta w_{ij}^l(p,q)$ is computed. This expression represents the required change in weight $w_{ij}^l$ of the link connecting the neuron i of layer (l-1) to neuron j of layer l of the neural network of FIG. 1. This expression $\Delta w_{ij}^l(p,q)$ is computed in accordance with Equation (3) below which applies if $f(x_p) \leq f(x_q)$ for the objects $x_p > x_q$. Otherwise, the expression $\Delta w_{ij}^l(p,q)$ is equal to zero.

$$\Delta w_{ij}^l(p,q) = \eta(K\delta_{jl}(p)v_{jl}(p) - \delta_{il}(q)v_{jl}(q)) \quad (3)$$

In Equation (3) above, K is a constant between zero and one; that is, 0<K<1. A typical value of K may be, for example, 0.95. K is constant which forces the network output such that $f(x_q)/f(x_p)=K$ in the converged state where $x_p > x_q$ when the network makes a mistake. The parameter $\eta$ is a constant that is referred to as "learning rate". This value, $\eta$, is computed in accordance with Equation (4) below.

$$\eta = \frac{f(x_q) - K \cdot f(x_p)}{\sum_l \sum_{i,j} (\Delta w_{ij}^l(p,q))^2} \quad (4)$$

In Equation (4) above, the value for $\overline{\Delta w_{ij}^l(p,q)}$ is provided by the expression of Equation (3) below.

$$\overline{\Delta w_{ij}^l(p,q)} = (K\delta_{il})v_{jl}(p) - \delta_{il}(q)v_{jl}(q) \quad (5)$$

Further, $v_{jl}(p)$ and $v_{jl}(q)$ are respective outputs of the jth neuron in layer l of the network for $x_p$ and $x_q$ as inputs to the neural network. The output of node j of layer l for an input $x_p$ is calculated in accordance with Equation (6) below.

$$v_{jl}(p) = \frac{1}{1 + \exp(-u_{jl}(p))} \quad (6)$$

In Equation (6) above, $u_{jl}(p)$ is the total input to the jth node of layer l from the previous layer, given as $u_{jl}(p) = \Sigma w_{ij}^l v_{i,l-1}(p)$, for an input node $v_{j0}(p) = x_{pj}$ in which $x_p = (x_{p1}, x_{p2}, \ldots x_{pm})$. Similarly, $v_{jl}(q)$ can be computed for an input $x_q$, for different layers and nodes.

In the above Equations (3) to (6), $\delta_{jl}(p)$ and $\delta_{jl}(q)$ represent error that propagates backwards from the output layer to node j of layer l. In Equation (7) below, the error at a node i of layer l depends on the error of every node k of layer l+1 connected to node i. Thus, to compute the error at a particular node, the topmost layer, (that is., the output layer) in first considered and then the errors are computed successively downwards. In other words, the error in the output layer propagates backward down to the input layer. Error value $\delta$ can be recursively computed in accordance with Equation (7) below.

$$\delta_{il}(p) = \sum_k w_{ki} \delta_{k,l+1}(p) v_{il}(p)(1 - v_{il}(p)) \quad (7)$$

For the output layer, $\delta_{1,L}(p) = 1$. In this case, L is the number of layers. Similarly, $\delta_{jl}(q)$ can be computed for an input $x_q$.

The above-described training procedure of step 230 is repeated for all $(x_p, x_q)$ pairs in the ranked list r.

Verifying Revised Parameter Weights—Step 240

The average change in weights in the neural network is calculated in accordance with Equation (8) below.

$$\Delta w_{ij}^l = \frac{1}{N} \sum_{p \neq q} \Delta w_{ij}^l(p, q) \quad (8)$$

In Equation (8) above, N is the total number of instances in which the neural network makes an error in this iteration.

Weights $w_{ij}^l$ are updated in accordance with Equation (9) below.

$$w_{ij}^l = w_{ij}^l + \Delta w_{ij}^l \quad (9)$$

Steps 230 and 240 are both repeated until there is no significant change in $\Delta w_{ij}$, as determined in step 240. That is, until Equation (10) below is satisfied.

$$\sum_{i,j,l} |\Delta w_{ij}^l| < \varepsilon \quad (10)$$

In Equation (10), e is a small constant. Alternatively, the repeat-until loop can be repeated a predetermined number of times; that is, for a fixed number of iterations.

EXAMPLES

Examples are now described of implementing the error measure given by Equation (1) and (2) using other techniques apart from neural networks (or without any reference to neural networks). Optimization techniques, such as genetic algorithms (GA) or simulated annealing (SA) can be used to minimize the error expressed in Equations (1) and (2). A specific case of using genetic algorithm for minimizing the error measure is described, as provided in Equations (1) and (2).

The utility function can be described as a known parametric form of second order as expressed in Equation (11) below.

$$f(x) = a_0 + \sum_i a_i x_i + \sum_{i,j} a_{ij} x_i x_j \quad (11)$$

In Equation (11) above, i and j denote the indices of the attributes of the items/bids. One can extend this second order form to higher order forms also. However, that does not affect the usage of GA and the error measure in this algorithm.

The GA-based technique operates as described below under points (i) to (vi).
  (ii) Define chromosomes that encode the parameters a's. For example, if there are only two attributes, then there exist parameters a0, a1, a2, a12 (in total 4 parameters). Let all the parameters be bounded in −1<a<+1 and each can be encoded in 8 bits such that a maximum precision that can be achieved is 1/256 in the representation of the value of each parameter. Thus, in this example, a chromosome length will be 4 byte (32 bits).
  (iii) Initialize a pool of chromosomes (a pool can consist of a large number of chromosomes depending on the constraints imposed the systems running time and resources). In the above example, one can start with 16 chromosomes in a pool. Initialize each chromosome randomly.
  (iv) Perform the crossover operation on the chromosomes.
  (v) Perform a mutation operation.
  (vi) Evaluate each chromosome to determine the error each chromosome is representing over all the bids/items. Perform selection, such as Roullette-wheel selection so that the chromosomes representing lower error measure (according to Equations (1) and (2)) have a higher probability of selection.
  (vii) Go to the step (ii) and repeat the procedure until the minimum error represented by the pool of chromosome does not decrease any further.

The above algorithm does not involve the use of neural networks. This algorithm can determine the utility function of complex nonlinear form using stochastic optimization. This algorithm can also be used for higher order complex form of utility functions. In a similar manner, simulated annealing algorithm can be used to determine an optimal utility function of known complex form.

Application of Described Techniques

Consider the following application. A buyer wants to buy a digital camera. If the buyer goes to an online department store, he finds there are more than 100 digital cameras. Each digital camera has more than 12 attributes. The aim of the buyer is not to evaluate each of them separately but to evaluate a few of them and on the basis of these rank all the remaining cameras.

The camera attributes considered are price, CCD resolution, memory card included or not, optical zoom, digital zoom, width, height, depth, and weight. Two possible utility functions that a user can have on these cameras are considered, based on the above attributes. These utility functions are:
 (ii) Sum of Products: f(camera)=0.4u(price)+0.3u(CCD-res).U(mem-card-incl).U(opt-zoom).U(digital-zoom)+0.3 u(width).u(height).u(depth).u(weight)
 (iii) Product: f(camera)=u(price).u(CCD-res).u(mem-card-incl).u(opt-zoom).u(digital-zoom).u(width).u(height).u(depth).u(weight)

The effectiveness of the described techniques are tested for both of the above utility functions with random sampling and query based sampling algorithms. Different sizes of training sets, containing either a fully ranked set of cameras or the cameras are partially ranked, can be used.

The performance measure that can be used to evaluate the effectiveness of the described techniques are the number of actual top k cameras predicted in the top k positions by the described techniques.

Computer Hardware and Software

Figure 3:
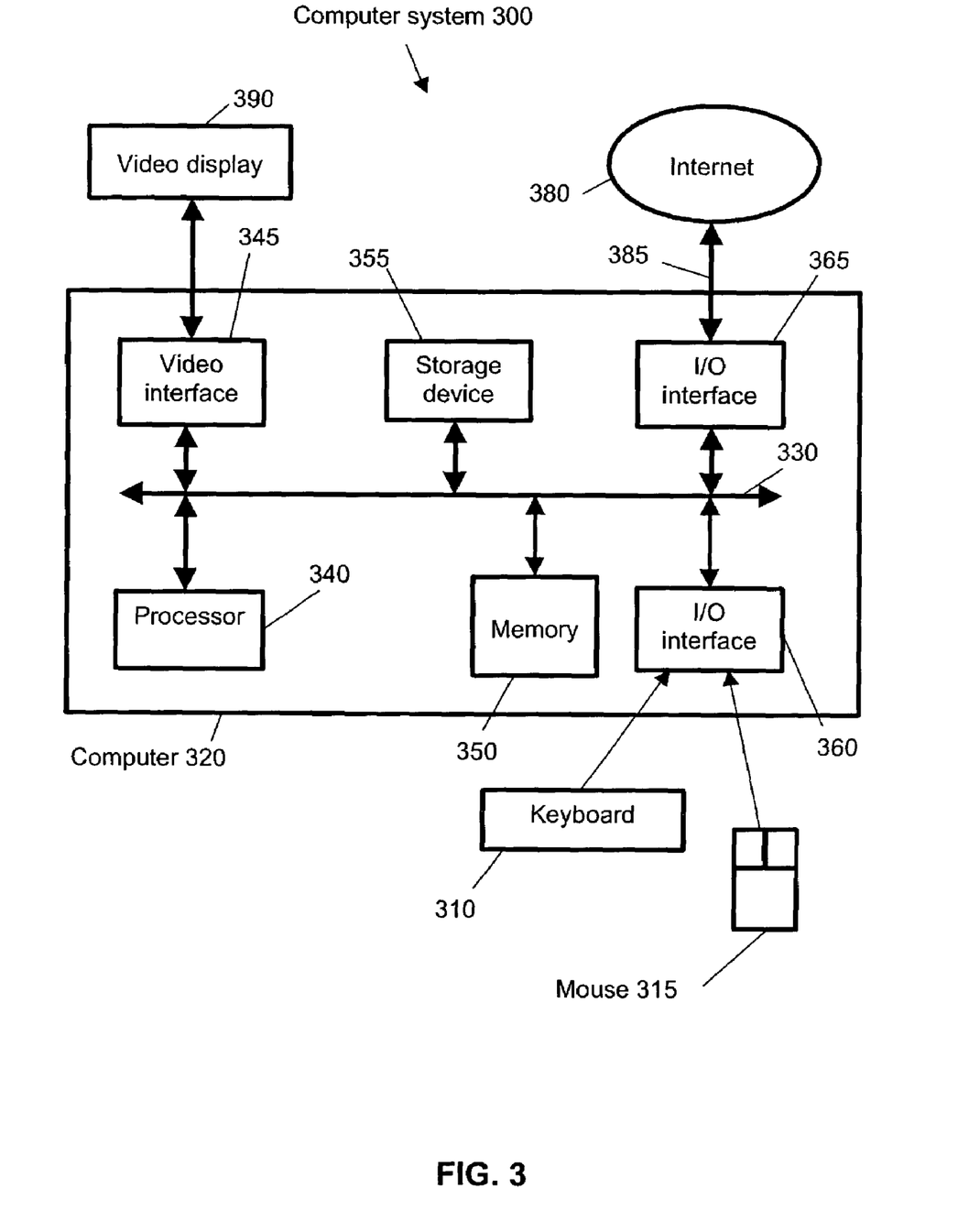
FIG. 3 is a schematic representation of a computer system suitable for performing the techniques described with reference to FIGS. 1 and 2.

FIG. 3 is a schematic representation of a computer system 300 that can be used to perform steps in a process that implement the techniques described herein. The computer system 300 is provided for executing computer software that is programmed to assist in performing the described techniques. This computer software executes under a suitable operating system installed on the computer system 300.

The computer software involves a set of programmed logic instructions that are able to be interpreted by the computer system 300 for instructing the computer system 300 to perform predetermined functions specified by those instructions. The computer software can be an expression recorded in any language, code or notation, comprising a set of instructions intended to cause a compatible information processing system to perform particular functions, either directly or after conversion to another language, code or notation.

The computer software is programmed by a computer program comprising statements in an appropriate computer language. The computer program is processed using a compiler into computer software that has a binary format suitable for execution by the operating system. The computer software is programmed in a manner that involves various software components, or code means, that perform particular steps in the process of the described techniques.

The components of the computer system 300 include: a computer 320, input devices 310, 315 and video display 390. The computer 320 includes: processor 340, memory module 350, input/output (I/O) interfaces 360, 365, video interface 345, and storage device 355.

The processor 340 is a central processing unit (CPU) that executes the operating system and the computer software executing under the operating-system. The memory module 1050 includes random access memory (RAM) and read-only memory (ROM), and is used under direction of the processor 1040.

The video interface 345 is connected to video display 390 and provides video signals for display on the video display 390. User input to operate the computer 320 is provided from input devices 310, 315 consisting of keyboard 310 and mouse 315. The storage device 355 can include a disk drive or any other suitable non-volatile storage medium.

Each of the components of the computer 320 is connected to a bus 330 that includes data, address, and control buses, to allow these components to communicate with each other via the bus 330.

The computer system 300 can be connected to one or more other similar computers via a input/output (I/O) interface 365 using a communication channel 385 to a network 380, represented as the Internet.

The computer software program may be provided as a computer program product, and recorded on a portable storage medium. In this case, the computer software program is accessed by the computer system 300 from the storage device 355. Alternatively, the computer software can be accessed directly from the network 380 by the computer 320. In either case, a user can interact with the computer system 300 using the keyboard 310 and mouse 315 to operate the programmed computer software executing on the computer 320.

The computer system 300 is described for illustrative purposes: other configurations or types of computer systems can be equally well used to implement the described techniques. The foregoing is only an example of a particular type of computer system suitable for implementing the described techniques.

Overview

Though techniques are described herein in the context of neural networks, other implementations are possible, such as those involving genetic algorithms, as noted above.

Figure 4:
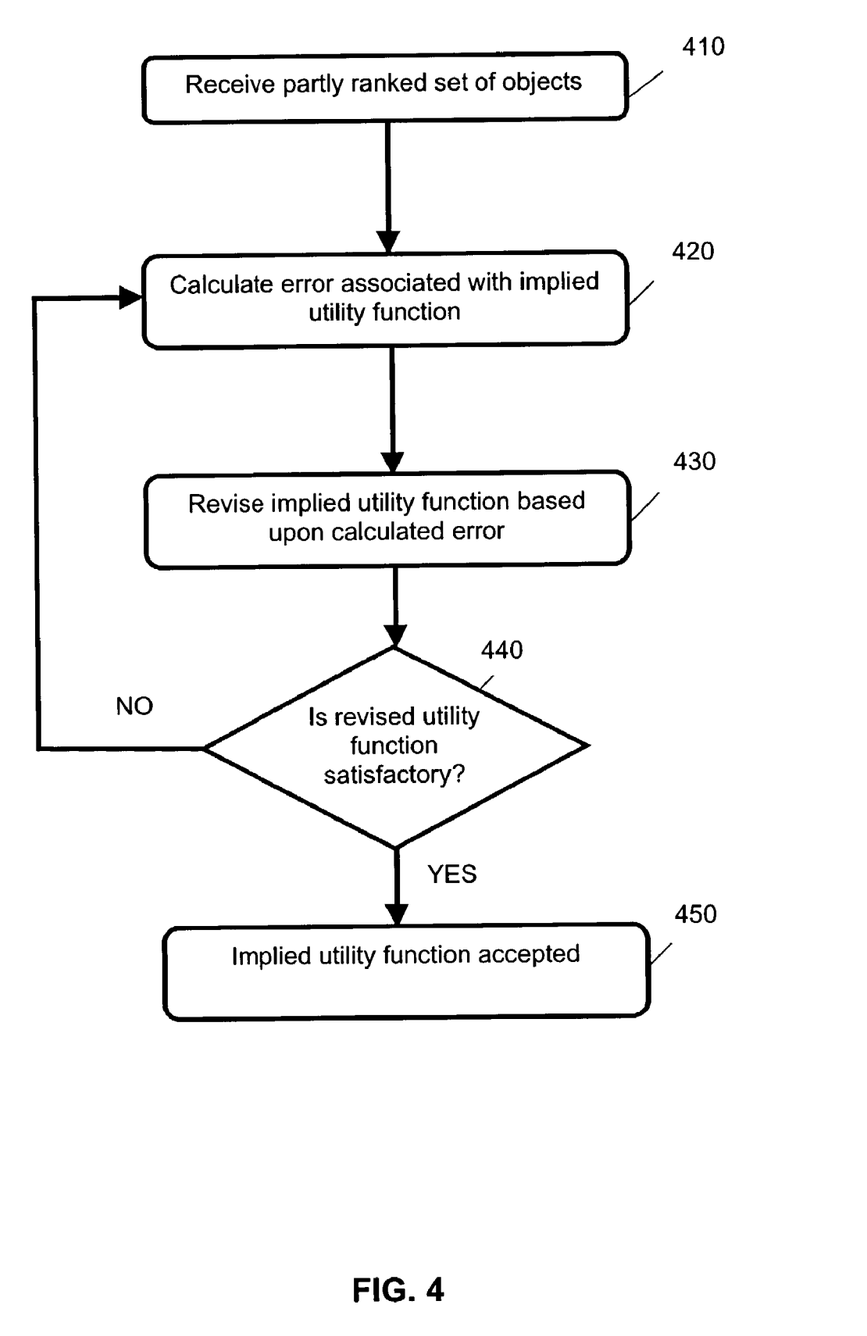

FIG. 4 flowcharts a generic implementation that does not necessarily use neural network capabilities. In step 410, an at least partly ranked list of multi-attribute objects is received. In step 420, an error measure associated with an implied utility function is calculated. In step 430, the implied utility function is revised, based upon the calculated error measure.

In step 440, a determination is made concerning whether the revised implied utility function is satisfactory. If the implied utility function is satisfactory, the implied utility function is accepted in step 450. Otherwise, steps 420 to 440 are repeated until the revised utility function is found to be satisfactory.

Conclusion

In the case of a RFQ problem, a buyer receives a set of responses from his suppliers, the buyer can choose a subset of the received responses and rank these responses. The ranked subset can be presented to the above-described algorithm to train a neural network to represent this utility function. This utility function so computed by the described algorithm can then be used to order the entire set of responses. The buyer is likely to choose a winning responses from amongst the top ranking responses.

Various analogous contexts exist in which the described techniques can also be applied in a similar manner.

The described techniques for learning a utility function over a subset of ranked objects have the following advantages.

No restriction is imposed on interactions between the individual attribute utilities.
No prior knowledge of individual attribute utility functions is required.
Neural networks can be used to learn user utility functions from the ranked list.

The objective function can be optimized with computing tools such as decision trees, support vector machines, evolutionary algorithms, Bayesian and belief networks, probabilistic reasoning.

The techniques described herein require only a set of ranked objects to generate a utility function.

Various alterations and modifications can be made to the techniques and arrangements described herein, as would be apparent to one skilled in the relevant art.

We claim:

1. A method for determining a utility function based upon paired preferences amongst objects, the method comprising:
    inputting ordered pairs of said objects, wherein:
        each of said objects is represented by an attribute vector and associated with goods and services,
        a number of said objects inputted is less than a total number of objects being ordered; and
        ordering of each pair of said objects is determined by a user;
    initializing a neural network for training;
    computing a change in parameter weights of said neural network for each ordered pair of said objects inputted, wherein said change in parameter weights comprises an average change in said parameter weights for all possible pairs of said total number of objects;
    calculating an error measure associated with a utility function;
    revising said utility function in response to said error measure;
    performing the calculating of said error measure and the revising until said error measure results in a user-defined difference between an ordered output of the ordered pairs of said objects inputted; and
    automatically generating a ranked list of said total number of objects associated with numerical values of said ordered output and said goods and services, and based on the utility function as an output.

2. The method as claimed in claim 1, all the limitations of which are incorporated herein by reference, wherein the utility function is implied by said neural network that is trained using at least one pair of objects $(x_i, x_j)$ from a set of objects.

3. The method as claimed in claim 2, all the limitations of which are incorporated herein by reference, wherein said total number of objects is fully ordered in said output.

4. The method as claimed in claim 3, all the limitations of which are incorporated herein by reference, wherein a partially ordered subset of objects $(x_i, x_j)$ are selected from said total number of objects.

5. The method as claimed in claim 2, all the limitations of which are incorporated herein by reference, wherein the output of said neural network corresponds to said utility function.

6. The method as claimed in claim 5, all the limitations of which are incorporated herein by reference, wherein the a measure of change in the weights of said neural network comprises an average value of change in said weights of said neural network.

7. The method as claimed in claim 1, all the limitations of which are incorporated herein by reference, wherein ranked list of said total number of objects is explicitly obtained from said output of said neural network.

8. The method as claimed in claim 1, all the limitations of which are incorporated herein by reference, wherein said attribute vector is inputted into said neural network, wherein said neural network comprises:
    a first layer adapted to receive said attribute vector;
    a second layer connected to said first layer; and a summation node connected to said second layer, wherein said summation node is adapted to output the utility function.

9. The method as claimed in claim 1, all the limitations of which are incorporated herein by reference, wherein said neural network comprises a feed-forward neural network.

10. The method as claimed in claim 2, all the limitations of which are incorporated herein by reference, wherein an architecture of said neural network is selected to suit a complexity of the utility function implied by the ranked list of said total number of objects.

11. A program storage device readable by computer, tangibly embodying a program of instructions executable by said computer to perform a method of determining a utility function based upon paired preferences amongst objects, the method comprising:
   inputting ordered pairs of said objects, wherein:
      each of said objects is represented by an attribute vector and associated with goods and services,
      a number of said objects inputted is less than a total number of objects being ordered; and
      ordering of each pair of said objects is determined by a user;
   initializing a neural network for training;
   computing a change in parameter weights of said neural network for each ordered pair of said objects inputted, wherein said change in parameter weights comprises an average change in said parameter weights for all possible pairs of said total number of objects;
   calculating an error measure associated with a utility function;
   revising said utility function in response to said error measure;
   performing the calculating of said error measure and the revising until said error measure results in a user-defined difference between an ordered output of the ordered pairs of said objects inputted; and
   automatically generating a ranked list of said total number of objects associated with numerical values of said ordered output and said goods and services, and based on the utility function as an output.

12. The program storage device as claimed in claim 11, all the limitations of which are incorporated herein by reference, wherein the utility function is implied by said neural network that is trained using at least one pair of objects $(x_i, x_j)$ from a set of objects.

13. The program storage device as claimed in claim 12, all the limitations of which are incorporated herein by reference, wherein said total number of objects is fully ordered in said output.

14. The program storage device as claimed in claim 13, all the limitations of which are incorporated herein by reference, wherein a partially ordered subset of objects $(x_i, x_j)$ are selected from said total number of objects.

15. The program storage device as claimed in claim 12, all the limitations of which are incorporated herein by reference, wherein the output of said neural network corresponds to said utility function.

16. The program storage device as claimed in claim 15, all the limitations of which are incorporated herein by reference, wherein measure of change in the weights of said neural network comprises an average value of change in said weights of said neural network.

17. The program storage device as claimed in claim 11, all the limitations of which are incorporated herein by reference, wherein the total number of objects is explicitly obtained from said output of said neural network.

18. The program storage device as claimed in claim 11, all the limitations of which are incorporated herein by reference, wherein said attribute vector is inputted into said neural network, wherein said neural network comprises:
   a first layer adapted to receive said attribute vector;
   a second layer connected to said first layer; and
   a summation node connected to said second layer, wherein said summation node is adapted to output the utility function.

19. The program storage device as claimed in claim 11, all the limitations of which are incorporated herein by reference, wherein said neural network is a feed-forward neural network.

20. The program storage device as claimed in claim 12, all the limitations of which are incorporated herein by reference, wherein an architecture of said neural network is selected to suit a complexity of the utility function implied by the total number of objects.

* * * * *